US012594501B2

(12) United States Patent
Kosugi et al.

(10) Patent No.: US 12,594,501 B2
(45) Date of Patent: Apr. 7, 2026

(54) GAME SYSTEM, GAME METHOD, GAME PROGRAM, AND INFORMATION PROCESSING DEVICE

(71) Applicant: The Pokemon Company, Tokyo (JP)

(72) Inventors: Kaname Kosugi, Tokyo (JP); Yuki Terada, Tokyo (JP); Marie Shuto, Tokyo (JP); Koya Nakahata, Tokyo (JP); Takumi Tsukada, Tokyo (JP); Keisuke Miyagawa, Tokyo (JP)

(73) Assignee: THE POKÉMON COMPANY, Tokyo (JP)

( * ) Notice: Subject to any disclaimer, the term of this patent is extended or adjusted under 35 U.S.C. 154(b) by 233 days.

(21) Appl. No.: 18/372,703

(22) Filed: Sep. 26, 2023

(65) Prior Publication Data

US 2024/0017176 A1    Jan. 18, 2024

Related U.S. Application Data

(63) Continuation of application No. PCT/JP2022/013738, filed on Mar. 23, 2022.

(30) Foreign Application Priority Data

Apr. 8, 2021    (JP) ................................. 2021-065934

(51) Int. Cl.
*A63F 13/00* (2014.01)
*A63F 13/212* (2014.01)
(Continued)

(52) U.S. Cl.
CPC ............ *A63F 13/69* (2014.09); *A63F 13/212* (2014.09); *A63F 13/533* (2014.09); *A63F 13/65* (2014.09)

(58) Field of Classification Search
CPC ................................. G06F 3/011; G06F 3/015
See application file for complete search history.

(56) References Cited

U.S. PATENT DOCUMENTS 10,646,166 B2 *    5/2020    Kido .................... A61B 5/4812

FOREIGN PATENT DOCUMENTS

JP    2020-065642 A    4/2020
JP    2021-013554 A    2/2021

OTHER PUBLICATIONS

Notice of Reasons for Refusal mailed on Feb. 13, 2023, received for JP Application 2021-065934, 6 pages Including English Translation.
(Continued)

*Primary Examiner* — David L Lewis
*Assistant Examiner* — Eric M Thomas
(74) *Attorney, Agent, or Firm* — XSENSUS LLP

(57) ABSTRACT

A game system acquires the sleep information of a user and a game that uses the sleep information can be advanced even in a situation where the sleep information cannot be measured appropriately. The game system includes processing circuitry configured to acquire the sleep information of the user, generate modified sleep information with respect to at least a part of the sleep information by modifying the sleep information on the basis of sleep information having different content to the sleep information. When the modified sleep information has not been generated, the processing circuitry determines a first effect of the game on the basis of the sleep information, and when the modified sleep information has been generated, the processing circuitry determines a second effect, the second effect differing from the first effect, on the basis of the modified sleep information.

17 Claims, 5 Drawing Sheets

(51) Int. Cl.
   *A63F 13/533*     (2014.01)
   *A63F 13/65*     (2014.01)
   *A63F 13/69*     (2014.01)

(56)                    References Cited

OTHER PUBLICATIONS

International Search Report and Written Opinion mailed on Jun. 7, 2022, received for PCT Application PCT/JP2022/013738, filed on Mar. 23, 2022, 9 pages including English Translation.
Written Opinion of the International Searching Authority mailed on Jun. 7, 2022, received for PCT Application PCT/JP2022/013738, filed on Mar. 23, 2022, 4 pages. (Previously filed; submitting English translation only.).

* cited by examiner

| USER ID | USER INFORMATION | GAME HISTORY INFORMATION | HELD ITEMS | SLEEP INFORMATION |
|---------|------------------|--------------------------|------------|-------------------|

218

| GAME INFORMATION ID | GAME INFORMATION |
|---------------------|------------------|

220

216

GAME SYSTEM, GAME METHOD, GAME PROGRAM, AND INFORMATION PROCESSING DEVICE

CROSS-REFERENCE TO RELATED APPLICATIONS

This application is a continuation of International Application No. PCT/JP2022/013738, filed Mar. 23, 2022, which claims priority to JP 2021-065934, filed Apr. 8, 2021, the entire contents of each are incorporated herein by reference.

BACKGROUND

Field

The present disclosure relates to a game system, a game method, a game program and an information processing device. More specifically, the present disclosure relates to a game system, a game method, a game program and an information processing device in which game advancement processing is executed using sleep information of a user.

Description of the Related Art

A conventional, well-known program that executes game advancement processing on the basis of the sleep information of the user causes a computer to function as a sleep information acquisition unit for acquiring the sleep information, and a determination unit for determining whether the acquired sleep information is the sleep information of the user (see PTL 1, for example). According to the program described in PTL 1, it is possible to prevent unauthorized use of sleep information in a game that advances on the basis of the sleep information of the user.

CITATION LIST

Patent Literature

[PTL 1] Japanese Patent Application Publication No. 2020-65642

SUMMARY

Technical Problems

In the program described in PTL 1 or a conventional game program that uses sleep information, the sleep information can be acquired by various methods using various devices and so on that include various sensors and the like. However, when a program or a system is premised on the acquisition of highly accurate sleep information, a device capable of acquiring highly accurate sleep information is required, and therefore the number of users who can enjoy a game that uses the sleep information is limited. When, on the other hand, there are no limits on accuracy and the program or system is configured to use sleep information acquired by any of various devices capable of acquiring sleep information, the user population who can enjoy the game increases. However, when a device or the like that acquires sleep information with low accuracy is used, cases in which a sleep measurement result does not reflect the actual sleep state of the user may occur. Moreover, in a game that uses sleep information, since almost all users sleep only once per day, a game result can be acquired only once per day. In this case, when an error of some type occurs during sleep such that the sleep information cannot be acquired, a game result cannot be acquired, and this may be extremely detrimental or dissatisfying to the user in comparison with a game that does not use sleep information.

Hence, an object of the present disclosure is to provide a game system, a game method, a game program and an information processing device with which the sleep information of a user can be acquired appropriately and a game that uses the sleep information can be advanced even in a situation where the sleep information cannot be measured appropriately.

Solutions to Problems

To achieve the object described above, the present disclosure provides a game system for executing a game that uses sleep information relating to the sleep of a user, the game system including a sleep information acquisition unit that acquires the sleep information of the user, a sleep information modification unit that generates modified sleep information with respect to at least a part of the sleep information by modifying the sleep information on the basis of sleep information having different content to the sleep information, and a game control unit which, when the modified sleep information has not been generated by the sleep information modification unit, determines a first effect of the game on the basis of the sleep information, and when the modified sleep information has been generated by the sleep information modification unit, determines a second effect, the second effect differing from the first effect, on the basis of the modified sleep information.

Advantages

With the game system, game method, game program and information processing device according to the present disclosure, it is possible to provide a game system, a game method, a game program and an information processing device with which the sleep information of a user can be acquired appropriately and a game that uses the sleep information can be advanced even in a situation where the sleep information cannot be measured appropriately.

BRIEF DESCRIPTION OF DRAWINGS

FIG. 2 is a block diagram of a functional configuration of the game system according to the present embodiment.

FIG. 3 is a data configuration diagram of each storage unit included in a storage unit according to the present embodiment.

DETAILED DESCRIPTION

<Overview of Game System 1>

Figure 1:
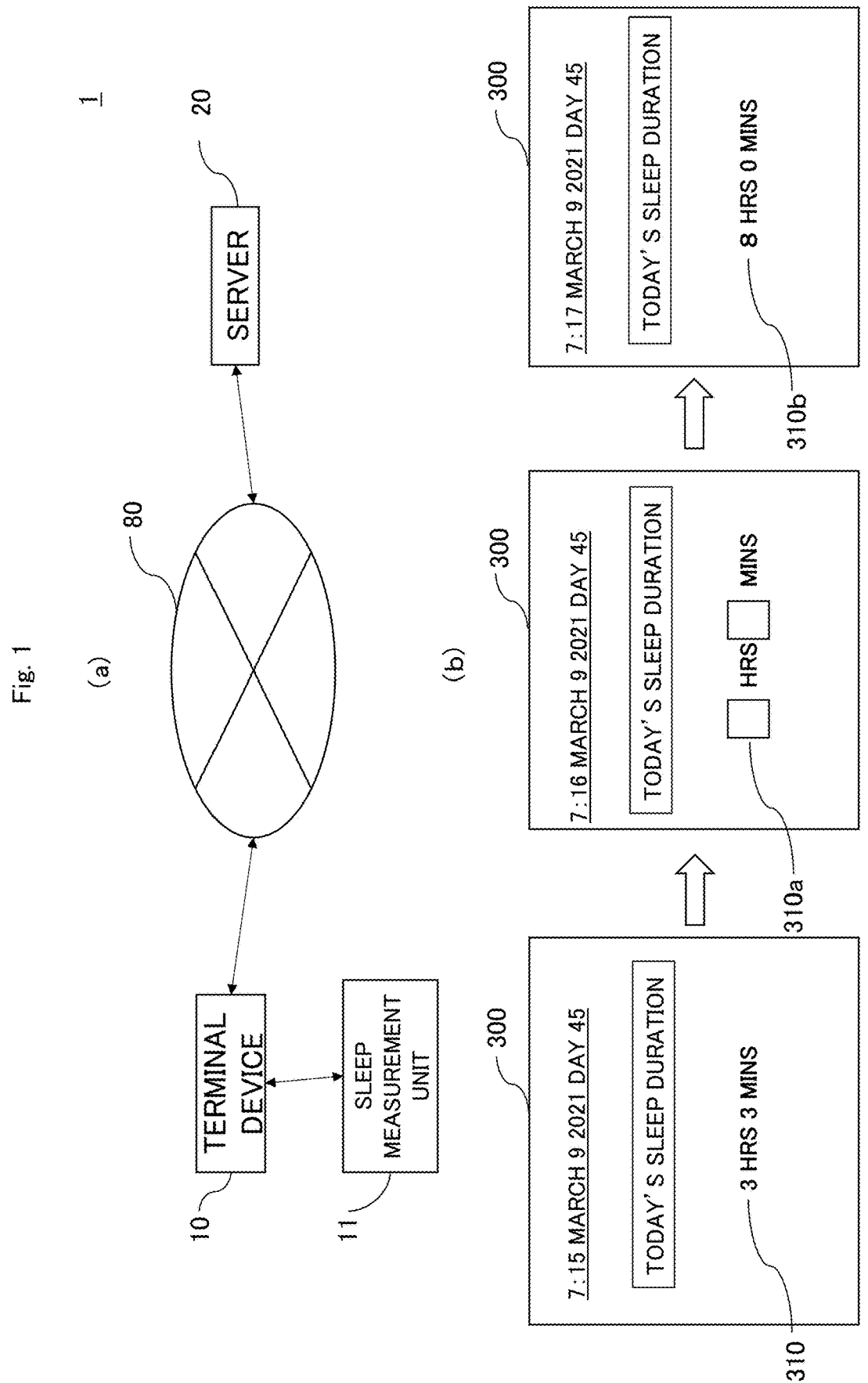
FIG. 1 is a schematic view of a game system according to the present embodiment.

FIG. 1 shows an overview of a game system according to one or more aspects of the disclosed subject matter. More specifically, FIG. 1(*a*) shows an exemplary overview of the configuration of a game system 1, and FIG. 1(*b*) shows an example of a display flow of a terminal device 10 provided in the game system 1. In FIG. 1(*b*), time elapses from left to right.

The game system 1 according to a present embodiment is a system for executing a game using sleep information relating to the sleep of a user. As shown in FIG. 1(*a*), the game system 1 includes the terminal device 10 of the user, a sleep measurement unit 11 for measuring the sleep state of the user, and a server 20 for executing game processing. The terminal device 10 and the server 20 are connected through a communication network 80 so as to be capable of bidirectional communication. Further, in the game system 1, the server 20 advances the game upon receipt of the sleep information of the user. Note that the game system 1 may also be a server client type game system. Furthermore, the sleep measurement unit 11 may be an independent device that is separate from the terminal device 10, or may be built into the terminal device 10.

Note that in the example shown in FIG. 1(*a*), one terminal device 10 is connected to the server 20 through the communication network 80, but a plurality of terminal devices 10 used respectively by different users may be connected to the server 20 through the communication network 80. In order to simplify the following description, an example in which one terminal device 10 is connected to the server 20 through the communication network 80 will be described.

The game system 1 acquires the sleep information (the sleep duration, for example) of the user, which is measured by the sleep measurement unit 11, and determines a game effect on the basis of the acquired sleep information. For example, the game system 1 can accumulate the acquired sleep information and output a history of the sleep state of the user, or give the user a reward (for example, experience points, in-game virtual currency, a predetermined character or item, or the like) determined on the basis of the acquired sleep information.

More specifically, when the user falls asleep, the game system 1 detects that the user has started to settle down to sleep through the terminal device 10 and starts to acquire the sleep information of the user. Then, after detecting that the user has woken up through the terminal device 10, the game system 1 stops acquiring the sleep information of the user and determines a game effect on the basis of the acquired sleep information. The game system 1 then outputs a game result to the terminal device 10.

For example, after detecting that the user has woken up, the game system 1 displays the acquired sleep information on a display unit 300 of the terminal device 10. As shown in FIG. 1(*b*), for example, the game system 1 displays predetermined information such as the current time, date information, and the number of consecutive days on which sleep information has been acquired together with the sleep duration of the user in a predetermined display area 310 of the display unit 300 (in the example of FIG. 1(*b*), "3 hours, 3 minutes" is displayed as "Today's sleep duration").

Here, in the game system 1, a correction to the sleep information can be received by receiving operation input from the user. For example, when the user determines that the sleep duration displayed in the display area 310 is not the correct sleep duration, the game system 1 can receive operation input from the user and correct the sleep duration. Note that when the game system 1 determines that there is a predetermined abnormality in the acquired sleep duration by referring to the past sleep history of the user, the user may be prompted to correct the sleep duration from the game system 1 side. For example, in the game system 1, when the sleep duration displayed in the display area 310 differs from an average value of the past sleep duration of the user (for example, the arithmetic mean of the past sleep duration) by a predetermined duration or more, the user can be prompted to correct the sleep duration from the game system 1 side. Then, as shown in FIG. 1(*b*), the game system 1 receives predetermined operation input from the user and displays a form for receiving input of a correction to the sleep duration in a predetermined display area 310*a* of the display unit 300. The game system 1 then receives operation input from the user in relation to the form and corrects the sleep duration. In the example of FIG. 1(*b*), as shown in a display area 310*b* of the display unit 300, the sleep duration is corrected to "8 hours, 0 minutes". The game system 1 determines the game effect on the basis of the corrected sleep duration. The game system 1 then outputs a game result corresponding to the determined game effect to the terminal device 10.

Furthermore, the game system 1 may display the game effect determined on the basis of the sleep information measured by the sleep measurement unit 11 and the game effect determined on the basis of the sleep information corrected upon receipt of operation input from the user in a comparable fashion on the display unit 300. The game system 1 may then receive operation input from the user so as to determine a game effect on the basis of either the sleep information measured by the sleep measurement unit 11 or the corrected sleep information.

Thus, the game system 1 is capable of acquiring sleep information from when the user settles down to sleep to when the user wakes up, and also correcting a part of the sleep information after the user wakes up. Then, when the sleep information has been corrected, the game system 1 can determine the game effect using the corrected sleep information. Hence, in the game system 1, when a defect occurs during acquisition of the sleep information by the sleep measurement unit 11 or when the sleep information cannot be acquired appropriately due to an error of some type, the user is permitted to correct the sleep information, whereupon the game processing can be executed using the corrected sleep information. According to the game system 1, therefore, the sleep information relating to the sleep of the user can be corrected to appropriate content, and as a result, the user can remain motivated to continue the game even when the sleep information cannot be acquired due to a defect of some type.

Note that the terminal device 10 may be connected to one or a plurality of sleep measurement units 11 either by wire or wirelessly. FIG. 1(*a*) shows one sleep measurement unit 11, but a plurality of sleep measurement units 11 may be connected to the terminal device 10. Moreover, one or more sleep measurement units 11 may be built into the terminal device 10.

Further, the terminal device 10 is a device that can be operated by the user. For example, the terminal device 10 may be a mobile telephone or a mobile terminal such as a smartphone or tablet that is compatible with a mobile communication system. Alternatively, the terminal device 10 may, for example, be a stationary-type personal computer (PC), a laptop PC, a notebook PC, a portable game console and/or a household game console, a dedicated game console, or the like. Furthermore, the communication network 80 is a mobile telephone network and/or a communication network such as the Internet. The communication network 80 can also include a communication network such as a wired LAN or a wireless LAN. In addition, while details of the game system 1 according to the present embodiment will be described below, it is to be understood that names, numerical values, and the like in the description given above and the description given below are merely exemplary, that the present disclosure is not limited to such names, numerical values, and the like, and that such names, numerical values, and the like are not necessarily related to actual names, numerical values, and the like.

<Details of Game System 1>

Figure 2:
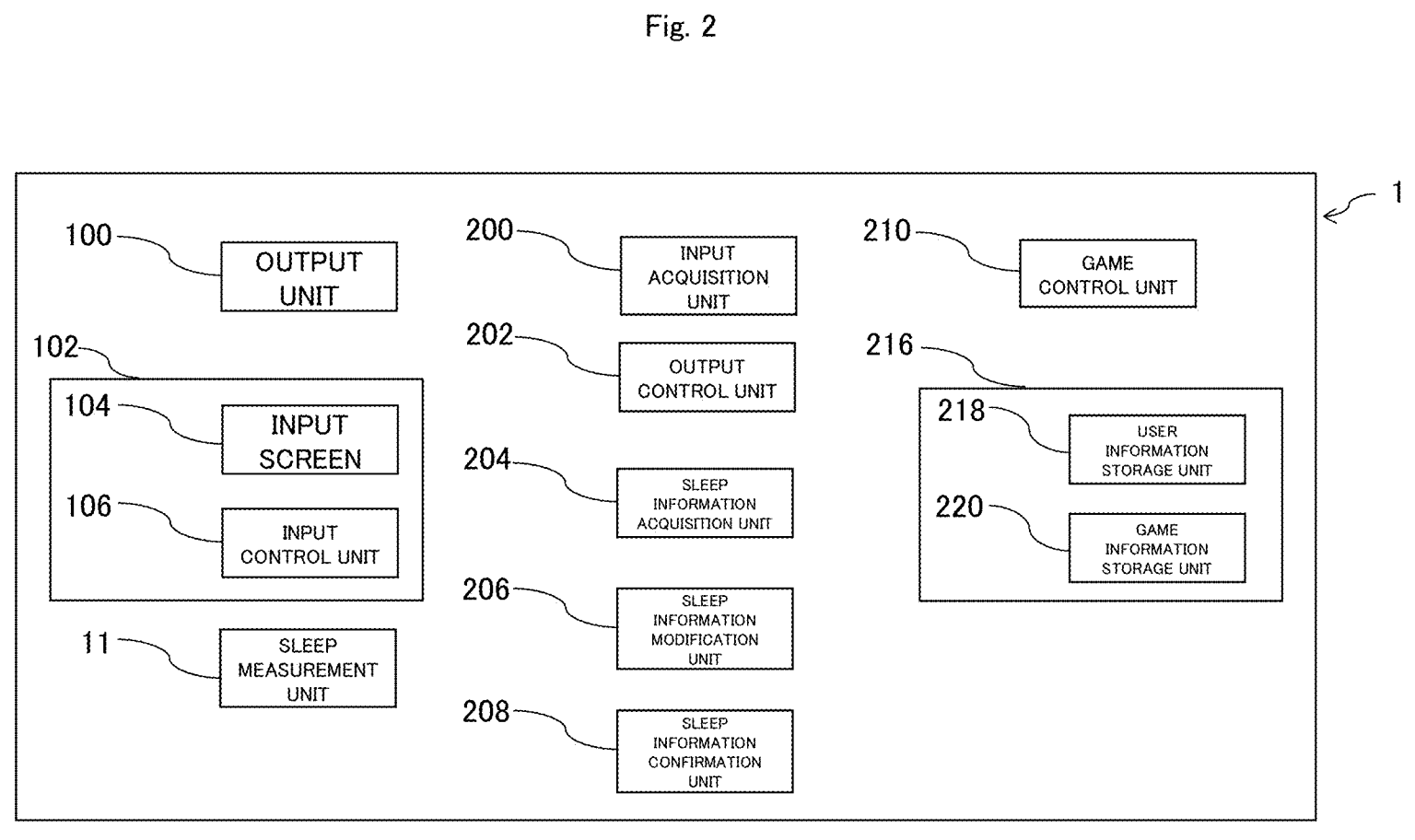

FIG. 2 is a diagram showing a functional configuration of the game system according to the present embodiment. In addition, FIG. 3 shows an example of a data configuration of each storage unit included in a storage unit included in the game system according to the present embodiment.

[Overview of Configuration of Game System 1]

The game system 1 according to the present embodiment is a system for executing a game using sleep information relating to the sleep of the user. The game system 1 includes an output unit 100 for outputting various information, an input unit 102 for receiving input from the user, the sleep measurement unit 11 for measuring the sleep state of the user, an input acquisition unit 200 for acquiring information relating to the input received from the user, an output control unit 202 for controlling the output of information to the output unit 100, a sleep information acquisition unit 204 for acquiring the sleep information of the user, a sleep information modification unit 206 for modifying the sleep information, a sleep information confirmation unit 208 for confirming the sleep information, a game control unit 210 for controlling various types of processing performed in the game, including determining the game effect, and a storage unit 216 for storing various information. The storage unit 216 includes a user information storage unit 218 for storing information relating to the user, and a game information storage unit 220 for storing information relating to the game.

In the game system 1, for example, the game is executed in the terminal device 10 used by the user. In this case, the terminal device 10 is configured so as to at least include the output unit 100 and the input unit 102.

In the game system 1, the plurality of constituent components described above may be physically disposed in the same device or location, or some of the plurality of constituent components described above may be disposed in a physically remote location. In this case, the constituent components may be connected by a communication network such as the Internet, for example. In the game system 1, for example, some of the functions of the constituent components may be performed by an external server. Alternatively, the game system 1 may be constituted by one or a plurality of servers. In this case, the game system 1 is configured by combining the terminal device with the constituent components of one server and the constituent components of another server. Furthermore, in the present embodiment, the devices (the terminal device, the server, and so on) may be considered as an information processing device. More specifically, an aggregate of the devices (a predetermined aggregate of the constituent components) may be considered as a single "information processing device", and the game system 1 may be formed as an aggregate of a plurality of information processing devices. A method for distributing the plurality of functions required to realize the game system 1 according to the present embodiment to one or a plurality of pieces of hardware can be determined as appropriate in consideration of the processing capacity of each piece of hardware and/or the specifications required of the game system 1, and so on. Furthermore, the various information stored in the storage unit 216 may be updated by an instruction from a user or information received through the input unit 102 or updated as needed by acquiring predetermined information from a predetermined server that exists outside of the game system 1.

<Details of Configuration of Game System 1>

In the following description, a case in which the game provided by the game system 1 is mainly executed by the user using the terminal device 10 (for example, a smartphone, a tablet terminal, a PC, or the like) will be described as an example. Note that the server 20 manages the user information used in the game system 1 and executes the game processing. The user information includes game characters and game items held by the user, an amount of held virtual currency (including virtual currency given to the user free of charge and virtual currency given to the user for a fee), the sleep information of the user, which is measured by the sleep measurement unit 11, and so on.

(Game Control Unit 210)

A game control unit 210 realizes communication between the terminal device 10 and the server 20 in order to advance the gameplay of the user on the basis of the sleep information of the user, which is received from the terminal device 10. For example, the game control unit 210 advances the gameplay by determining, by lottery, game objects such as characters and items that are to appear during the gameplay of the user. Note that the determined characters, items, and so on may be characters, items, and so on that appear during the gameplay rather than characters, items, and so on that are owned by the user. This makes it possible for the user to have an experience such as discovering a new game character or the like on the basis of the sleep information. Alternatively, the game control unit 210 may draw a game object such as a character or an item by lottery and give the game object to the user. For example, the game control unit 210 receives sleep duration information or sleep quality information as the sleep information of the user from the terminal device 10 of the user, draws an item or the like by lottery on the basis of the sleep information of the user, and gives the user the item or the like. Here, the game control unit 210 may modify a lottery table used in the lottery or the number of lottery draws in accordance with the sleep information of the user. Accordingly, when the sleep information is different, the lottery algorithm also differs, leading to variation in the progress of the game upon waking up, and as a result, the user can enjoy the variation upon waking up.

Furthermore, the game control unit 210 executes various types of game processing in accordance with operation input received from the user through the input unit 102. For example, the game control unit 210 executes game processing such as processing for giving a predetermined item to a character, processing relating to operations performed by a character specified by the user within the virtual space of the game when the user specifies the character, processing by which the user acquires items either free or charge or for a fee and processing by which the user acquires virtual currency, and processing for consuming an item held by the user.

(Output Unit 100, Output Control Unit 202)

The output unit 100 is controlled by the output control unit 202 so as to output various information (for example, text information, image information concerning static images and moving images, voice information, and so on) relating to execution of the game. The output unit 100 outputs various processing results and information stored in the storage unit 216 so as to be perceivable by the user. More specifically, the output control unit 202 causes the output unit 100 to output various processing results acquired in each constituent component, the information stored in the storage unit 216, and so on as data, static images, moving images, and/or text in predetermined formats. The output unit 100 may output information received from an external server. Note that the output unit 100 may be configured to include a display unit for displaying the various information, a voice output unit such as a speaker for outputting a voice, and so on. Further, the display unit may be a liquid crystal display or an organic EL display, for example.

Furthermore, the output control unit 202 controls the output of predetermined information to the output unit 100. For example, the output control unit 202 causes the output unit 100 to output the sleep information acquired by the sleep information acquisition unit 204 and sleep information modified upon receipt of operation input from the user (referred to hereinafter as "modified sleep information"), and/or various information used in the game, such as game effects determined by the game control unit 210.

(Input Unit 102, Input Screen 104, Input Control Unit 106)

The input unit 102 receives input such as predetermined instructions and operations from the user. The input unit 102 supplies the instructions to predetermined constituent components of the game system 1. The constituent components that receive the instructions respectively perform predetermined functions. The input unit 102 is an input device (for example, a touch panel, a touch pad, a pointing device such as a mouse, a keyboard, a motion sensor, or the like) for receiving operation input from the user. In the present embodiment, an example in which the input unit 102 is a touch panel provided in the terminal device 10 will be described. Note that the touch panel may be multi-touch-detectable. More specifically, the touch panel serving as the input unit 102 includes an input screen 104 on which operations and the like are input from the user, and an input control unit 106 that acquires information relating to the operations input on the input screen 104. The touch panel is arranged so as to overlap the display unit serving as the output unit 100, and the surface of the touch panel corresponds to the input screen 104.

For example, an area for receiving a predetermined instruction is displayed on the display unit, and the input screen 104 detects the predetermined instruction in a position specified by a user operation (for example, a touch operation, a tap operation, a slide operation, or the like) performed in this area of the input screen 104. The input screen 104 supplies the detected information, or in other words information indicating the predetermined instruction in the detected position, to the input control unit 106. For example, an area for receiving a sleep start instruction from the user, an area for receiving a waking instruction from the user, and so on are displayed on the display unit. The input control unit 106 acquires information indicating the predetermined instruction from the input screen 104 and supplies this information to a predetermined constituent component of the game system 1.

(Sleep Measurement Unit 11)

The sleep measurement unit 11 acquires information relating to the sleep of the user of the terminal device 10. The sleep measurement unit 11 supplies the acquired information to the sleep information acquisition unit 204. Note that when the terminal device 10 and the sleep measurement unit 11 are separate, independent devices, the terminal device 10 communicates with the sleep measurement unit 11 by short-range wireless communication such as Bluetooth (registered trademark) or Wi-Fi and receives sensing results from the sleep measurement unit 11. Alternatively, the sleep measurement unit 11 may transmit sensing results to the server 20 in accordance with the communication standards of a mobile communication system such as 5G, i.e., without using short-range wireless communication. In this case, the terminal device 10 may receive the sleep information acquired in the server 20 that receives the sensing results from the sleep measurement unit 11 from the server 20 and store the received sleep information.

The sleep measurement unit 11 is realized by a motion sensor or the like built into the terminal device 10, for example. In other words, the terminal device 10 and the sleep measurement unit 11 may be provided in the same device. In this case, the terminal device 10 also functions as the sleep measurement unit 11. Further, the sleep measurement unit 11 may be a wearable device of a wristwatch type, a ring type, an eye mask type, or the like worn on the body of the user, or may be configured to include a motion sensor such as a gyro sensor as a device that is independent of the terminal device 10. In addition, the sleep measurement unit 11 may be a device that is placed on a mattress on which the user sleeps, a headboard, or the like.

Here, the motion sensor can be configured to include an acceleration sensor, an angular velocity sensor, and so on, and the motion sensor senses movement of the terminal device 10 and outputs sensing results. For example, by placing the terminal device 10 on the mattress or the like of the bed on which the user sleeps, when the sleeping user moves on the mattress, the motion sensor can detect this motion. Using the sensing results acquired by the motion sensor, the sleep information acquisition unit 204, to be described below, can determine whether the user is asleep or awake, whether the sleeping user is sleeping lightly or deeply, whether the user is in REM sleep or non-REM sleep, and so on, and can acquire this information as the sleep information.

Note that the user may use two or more sleep measurement units 11 simultaneously. For example, the user may wear two wristwatch-type sleep measurement units 11 or may use a smartphone as the sleep measurement unit 11 while wearing a wristwatch-type sleep measurement unit 11. This makes it possible to detect motions of the body of the user during sleep using a gyro sensor or the like. By accumulating sensing results sensed by various sensors while the user is asleep, the sleep information acquisition unit 204 can determine whether the user is asleep, whether the user is in a state of light sleep or deep sleep, whether the user is in REM sleep or non-REM sleep, and so on, and can acquire this information as the sleep information. By identifying a waveform of REM sleep or non-REM sleep or the like in this manner, the quality of the sleep of the user can be evaluated. For example, cycles of REM sleep and non-REM sleep in the case of good-quality sleep can be set in advance, and the sleep information acquisition unit 204 can evaluate the quality of the sleep of the user by comparing the preset cycles with the waveforms of the REM sleep and non-REM sleep of the user while asleep and acquire the result as the sleep information.

Further, the sleep information acquisition unit 204 can detect that the user has gotten into bed (for example, is lying down horizontally on a bed) and has fallen asleep after getting into bed on the basis of the output from the motion sensor of the sleep measurement unit 11 or the like. Furthermore, the sleep information acquisition unit 204 can determine whether the user has performed an input operation on the terminal device 10, whether the user has viewed the information output to the output unit 100 of the terminal device 10, and so on after getting into bed and before falling asleep. In other words, the sleep information acquisition unit 204 can determine whether or not the user operated the terminal device 10 before falling asleep when the user was about to fall asleep.

Moreover, the sleep measurement units 11 assumed in advance to be used by the game system 1 are managed in a so-called white list format. Note that when the sleep information acquisition unit 204, to be described below, acquires sleep information from a sleep measurement unit 11 that is not managed by the game system 1, the sleep information acquisition unit 204 may determine that the sleep measurement unit 11 is a sleep measurement unit that cannot be identified by the server 20 and either refuse to receive the sleep information or execute the subsequent processing using parameters used for an unidentifiable sleep measurement unit 11 or the like.

Furthermore, differences in the type of the sleep measurement unit 11 do not necessarily need to be differences in devices. More specifically, even sleep measurement units 11 having the same device configuration may be managed as different sleep measurement units 11 in the game system 1 in accordance with types of software or applications used up to supply of the sleep information to the server 20. For example, when sleep information is detected using the same sleep measurement unit 11, the sleep measurement unit can be managed using different "sleep measuring device IDs" in a case where a sleep measuring application A is used to process the sleep information and a case where a sleep measuring application B that differs from the sleep measuring application A is used to process the sleep information. By managing the sleep measurement unit using different "sleep measuring device IDs" in accordance with a combination of the type of device serving as the device configuration and the used application in this manner, the sleep information can be generated more flexibly, and as a result, enjoyment of the game corresponding to the sleep state can be sufficiently exhibited.

(Input Acquisition Unit 200)

The input acquisition unit 200 acquires operation input from the user. More specifically, the input acquisition unit 200 acquires through the input control unit 106 information indicating operation input from the user, which is input into the input screen 104. The input acquisition unit 200 supplies the acquired information indicating the operation input to other predetermined constituent components.

(Sleep Information Acquisition Unit 204)

The sleep information acquisition unit 204 acquires the sleep information of the user and/or error information (information indicating that an unforeseeable defect has occurred, a defect has occurred in the sleep measurement unit 11, or the like). More specifically, the sleep information acquisition unit 204 acquires the information relating to the sleep of the user that is acquired by the sleep measurement unit 11, or in other words acquires the sleep information from the sleep measurement unit 11. The sleep information is information such as, for example, the waking/sleep state of the user, date information, the time the user goes to bed, the time the user settles down to sleep, the time the user falls asleep, the time the user wakes up, the sleep duration, and/or the sleep quality. For example, the sleep information acquisition unit 204 acquires sleep information from the point at which the user starts to sleep (or the point at which the user goes to bed or settles down to sleep) to the point at which the user wakes up.

Further, the sleep information acquisition unit 204 determines whether or not the user has started to sleep and whether or not the user has woken up on the basis of the sleep information. More specifically, the sleep information acquisition unit 204 determines the point at which the user starts to sleep and the point at which the user starts to wake up on the basis of the sleep information acquired by the sleep measurement unit 11. The sleep information acquisition unit 204 supplies the acquired sleep information to the sleep information modification unit 206 and the game control unit 210.

Note that the sleep measurement unit 11 can start to acquire information relating to the sleep of the user when the input acquisition unit 200 acquires operation input indicating the start of sleep from the user through the input unit 102. In this case, the sleep information acquisition unit 204 determines that the user has started to sleep either in response to this operation input or on the basis of the sleep information acquired by the sleep measurement unit 11 (for example, information such as a sensing result from the motion sensor). Then, when the input acquisition unit 200 acquires operation input indicating waking up from the user through the input unit 102, the sleep measurement unit 11 stops acquiring the sleep information of the user. In this case, the sleep information acquisition unit 204 determines that the user has woken up either in response to this operation input or on the basis of the sleep information acquired by the sleep measurement unit 11. The sleep information acquisition unit 204 acquires the sleep information measured by the sleep measurement unit 11 from the user falling asleep to the user waking up in accordance with the determination that the user has started to sleep and the determination that the user has woken up.

Alternatively, the sleep measurement unit 11 may constantly acquire information relating to the sleep of the user. In this case, the sleep information acquisition unit 204 determines that the user has started to sleep either when the input acquisition unit 200 acquires operation input indicating the start of sleep from the user through the input unit 102 or on the basis of the sleep information acquired by the sleep measurement unit 11. The sleep information acquisition unit 204 then determines that the user has woken up either when the input acquisition unit 200 acquires operation input indicating waking up from the user through the input unit 102 or on the basis of the sleep information acquired by the sleep measurement unit 11. The sleep information acquisition unit 204 acquires the sleep information of the user, measured by the sleep measurement unit 11, from the time at which it is determined that the user has started to sleep to the time at which it is determined that the user has woken up.

(Sleep Information Modification Unit 206)

The sleep information modification unit 206 generates modified sleep information by modifying at least a part of the sleep information. More specifically, the sleep information modification unit 206 generates modified sleep information by modifying at least a part of the sleep information acquired by the sleep information acquisition unit 204. The sleep information modification unit 206 acquires sleep information having different content to the sleep information acquired by the sleep information acquisition unit 204 through operation input from the user, and generates modified sleep information by modifying at least a part of the sleep information using the acquired information. Note that the sleep information modification unit 206 may also generate modified sleep information by modifying at least a part of sleep information not acquired by the sleep information acquisition unit 204. Sleep information is not acquired when, for example, the user falls asleep and wakes up having forgotten to start operating the sleep measurement unit 11 or the like. In this case, the sleep information modification unit 206 acquires information about the sleep duration through operation input from the user, and generates modified sleep information including the acquired information about the sleep duration. The sleep information modification unit 206 supplies the modified sleep information to the game control unit 210. The game control unit 210 determines a game effect on the basis of the modified sleep information.

More specifically, when the sleep information acquisition unit 204 determines that the user has woken up, the output control unit 202 causes the output unit 100 to output the sleep information acquired by the sleep information acquisition unit 204 or error information. Next, when it is determined that the user has requested modification of the sleep information, the input acquisition unit 200 receives an instruction (for example, a correction instruction or a registration instruction) to input sleep information having different content to the acquired sleep information with respect to at least a part of the sleep information acquired by the sleep information acquisition unit 204. Note that the game control unit 210 can calculate an average value of the sleep duration of the user by referring to the past sleep information of the user, which is included in the sleep information of the user stored in the user information storage unit 218. The game control unit 210 then compares the calculated average value (the average sleep duration) with the sleep duration included in the sleep information acquired by the sleep information acquisition unit 204. When the comparison result indicates that the sleep duration included in the sleep information is longer or shorter than the average sleep duration by a predetermined time or more, the game control unit 210 may instruct the output control unit 202 to cause the output unit 100 to output information prompting the user to correct the sleep duration, regardless of whether or not the user has issued an instruction.

For example, the game control unit 210 instructs the output control unit 202 to cause the output unit 100 to output a form on which sleep information can be input. The input acquisition unit 200 then acquires information relating to operation input from the user on the form through the input unit 102. For example, the input acquisition unit 200 acquires sleep information having different content to the sleep information output by the output unit 100 from the user with respect to at least a part (the sleep duration, for example) of the sleep information through the input unit 102. The input acquisition unit 200 then supplies the acquired information to the sleep information modification unit 206. The sleep information modification unit 206 generates modified sleep information on the basis of the information acquired by the input acquisition unit 200. For example, the sleep information modification unit 206 modifies the sleep duration acquired by the sleep information acquisition unit 204 by replacing the sleep duration with the sleep duration corresponding to the instruction input by the user, which is acquired by the input acquisition unit 200, and in so doing generates modified sleep information.

Here, the sleep information modification unit 206 can generate modified sleep information by modifying information that is perceivable by the user, among the sleep information. Examples of sleep information that is perceivable by the user include sleep-related times, the sleep quality, and so on. For example, the sleep information modification unit 206 can generate modified sleep information by modifying a sleep-related time as the sleep information. The sleep-related time may be the sleep duration, the time the user goes to bed, the time the user settles down to sleep, the time the user falls asleep, and/or the time the user wakes up, and so on.

The sleep information modification unit 206 may also generate modified sleep information by modifying information relating to the quality of sleep as the sleep information. More specifically, when the output unit 100 is caused to output information relating to the quality of sleep as the sleep information acquired by the sleep information acquisition unit 204, the quality of sleep indicated by the information may differ from the quality of sleep recognized by the user. In this case, the game control unit 210 instructs the output control unit 202 to cause the output unit 100 to output a form on which information relating to the quality of sleep can be input. The input acquisition unit 200 then acquires information relating to operation input from the user on the form through the input unit 102. The input acquisition unit 200 supplies the acquired information relating to the operation input to the sleep information modification unit 206. The sleep information modification unit 206 generates modified sleep information including the quality of sleep indicated by the information.

Note that when the input acquisition unit 200 receives an input instruction to modify the sleep duration of the user as the sleep information, the sleep information modification unit 206 preferably generates the modified sleep information after receiving a modification that does not exceed a predetermined upper limit of a modifiable sleep duration with respect to the sleep duration modification corresponding to the input instruction. Thus, it is possible to prevent unlimited lengthening of the sleep duration serving as the sleep information. Furthermore, the sleep information modification unit 206 may provide an upper limit on the number of times modified sleep information is generated. For example, the sleep information modification unit 206 may provide an upper limit on the number of times modified sleep information can be generated within a predetermined period (one week, for example).

(Determination of Game Effects)

The game control unit 210 determines a game effect on the basis of the sleep information or the modified sleep information. For example, the game control unit 210 determines the content of a reward given to the user. The game control unit 210 may make the reward content serving as the game effect determined on the basis of the sleep information different from or identical to the reward content serving as the game effect determined on the basis of the modified sleep information. More specifically, when the sleep information is the sleep duration, the sleep quality, or the like and the sleep duration, sleep quality, or the like indicated by the sleep information is identical to the sleep duration, sleep quality, or the like indicated by the modified sleep information, either a different reward or an identical reward may be given to the user. From the viewpoint of avoiding instructions issued by the user to correct at least a part of the sleep information as much as possible, the reward content serving as the game effect determined on the basis of the sleep information is preferably made different from the reward content serving as the game effect determined on the basis of the modified sleep information. More specifically, when the modified sleep information has not been generated by the sleep information modification unit 206, the game control unit 210 determines a first effect of the game on the basis of the sleep information, and when the modified sleep information has been generated by the sleep information modification unit 206, the game control unit 210 determines a second effect, which differs from the first effect, on the basis of the modified sleep information.

As an example, it is assumed that although the actual sleep duration of the user was "8 hours", the sleep duration included in the sleep information is "3 hours", and therefore an instruction to correct the sleep duration to "8 hours" is issued by means of a user operation, whereupon modified sleep information indicating that the sleep duration is "8 hours" is generated. In this case, the rewards given to the user when the sleep duration included in the sleep information is provisionally set at "8 hours" and when the sleep duration included in the modified sleep information is "8 hours" may be either different or identical. Note, however, that when the reward content is set to be identical, the game control unit 210 may apply a predetermined penalty or load to the user with respect to an in-game parameter other than the reward when determining the game effect on the basis of the modified sleep information. For example, the penalty or load may be a penalty or load such as making it possible to generate modified sleep information when consumption of a predetermined item is received from the user, reducing a predetermined parameter of a character held by the user, and/or prohibiting gameplay for a predetermined period.

Examples of game effect determination by the game control unit 210 will be described below.

Example 1 of Game Effect Determination

When the sleep information acquisition unit 204 has acquired the sleep information, the game control unit 210 may provisionally determine the game effect (the first effect) on the basis of the sleep information, and when the sleep information modification unit 206 has generated modified sleep information, the game control unit 210 may provisionally determine the game effect (the second effect) on the basis of the modified sleep information. The game control unit 210 may then instruct the output control unit 202 to cause the output unit 100 to output the first effect and the second effect in a comparable fashion. When the input acquisition unit 200 acquires a selection instruction from the user to select either the first effect or the second effect through the input unit 102, the game control unit 210 can officially select the effect on the side for which the user issued the selection instruction as the game effect and advance the game.

Example 2 of Game Effect Determination

When the sleep information acquisition unit 204 has acquired the sleep information and the sleep information modification unit 206 has generated modified sleep information, the game control unit 210 may instruct the output control unit 202 to cause the output unit 100 to output the sleep information and the modified sleep information. Then, when the input acquisition unit 200 acquires a selection instruction from the user to select either the sleep information or the modified sleep information through the input unit 102, the game control unit 210 may determine the game effect using the information on the side for which the user issued the selection instruction.

Example 3 of Game Effect Determination

When a predetermined condition is satisfied, the sleep information modification unit 206 may make it possible to generate modified sleep information. For example, the pre-determined condition is a condition such as detecting a foreseeable error or an unforeseeable error or receiving from the user an instruction to consume a predetermined item. Thus, when data that would normally never appear on the game system 1 are detected due to a predetermined cause or an obvious error occurs such that the sleep information acquisition unit 204 cannot acquire appropriate sleep information, the game control unit 210 can determine the game effect using modified sleep information as appropriate sleep information.

Note that in a case where the sleep information modification unit 206 makes it possible to generate modified sleep information after receiving from the user consumption of a predetermined item, the predetermined item is an item (including in-game virtual currency) held by the user. Thus, a limitation is applied to the number of times modified sleep information can be generated. For example, the sleep information modification unit 206 may make it possible to generate modified sleep information in exchange for consuming a user-held item stored in the user information storage unit 218 and/or a predetermined amount of in-game virtual currency or the like held by the user. As an example, the sleep information modification unit 206 instructs the output control unit 202 to cause the output unit 100 to output a button or the like for receiving operation input from the user indicating whether or not the user wishes to generate modified sleep information in exchange for consuming a predetermined item or the like. Then, when the input acquisition unit 200 acquires operation input performed on the button through the input unit 102, the sleep information modification unit 206 makes it possible to generate modified sleep information.

Example 4 of Game Effect Determination

The game control unit 210 can set the effect determined on the basis of the modified sleep information as an effect having different content from the effect determined on the basis of the sleep information (in other words, the sleep information acquired by the sleep information acquisition unit 204). For example, the game control unit 210 can set a reward to be given to the user as the determined effect. In this case, the game control unit 210 may make the reward determined on the basis of the modified sleep information smaller than the reward determined on the basis of the sleep information. Alternatively, the game control unit 210 can set a fixed effect as the reward determined on the basis of the modified sleep information, regardless of the content of the modified sleep information (for example, by setting a reward that is determined in accordance with the length of the sleep duration serving as the sleep information as a fixed reward regardless of the length of the sleep duration, or the like).

Example 5 of Game Effect Determination

The game control unit 210 can store the sleep information acquired by the sleep information acquisition unit 204 in the user information storage unit 218 in association with the date on which the sleep information was acquired. The game control unit 210 may refer to the information stored in the user information storage unit 218, and when sleep information has been acquired consecutively, the game control unit 210 may give the user a predetermined reward corresponding to information (typically, the consecutive number of days) indicating consecutive acquisition. The sleep information modification unit 206 may then make it possible to generate modified sleep information on condition that giving of the predetermined reward given in accordance with the number of consecutive days on which the sleep information was acquired is either stopped or reset, or the reward is made smaller.

15
16

Example 6 of Game Effect Determination

When the sleep information or the modified sleep information includes information relating to the sleep quality, the game control unit 210 may determine a different game effect in accordance with the sleep quality. For example, the game control unit 210 may give the user different rewards (for example, characters, items, in-game virtual currency, or the like) when information indicating that the user slept more deeply than a predetermined reference is included as the information relating to the sleep quality and when information indicating that the user slept more lightly than the predetermined reference is included. Hence, according to the game system 1, the user can be given different rewards depending on whether the sleep of the user was light or deep, thereby allowing for a wide variety of game developments.

Example 7 of Game Effect Determination

When the sleep information modification unit 206 generates modified sleep information at least partially including sleep information not acquired by the sleep information acquisition unit 204, the game effect determined on the basis of the sleep information on the assumption that the sleep information acquisition unit 204 acquired this sleep information may be set to differ from the game effect determined on the basis of the modified sleep information. For example, it is assumed that in a case where the sleep information acquisition unit 204 has not acquired sleep information, the sleep information modification unit 206 acquires information about the sleep duration (x hours, for example) through operation input from the user and generates modified sleep information including the acquired sleep duration. In this case, the game control unit 210 can set the game effect (a third effect) determined in accordance with the acquired sleep information in a case where it is assumed that the sleep information acquisition unit 204 measured "x hours" as the sleep of the user to differ from the game effect (a fourth effect) determined in accordance with modified sleep information including the information "x hours" acquired through operation input from the user. For example, the reward given to the user that is determined by the fourth effect can be made larger or smaller than the reward given to the user that is determined by the third effect (the reward determined by the fourth effect is typically made smaller).

(Sleep Information Confirmation Unit 208)

After the game effect has been officially determined, the sleep information confirmation unit 208 confirms the content of the sleep information or the modified sleep information. More specifically, after the game effect has been officially determined in the game control unit 210 (in other words, after the game effect has been confirmed), the sleep information confirmation unit 208 receives information from the game control unit 210 indicating that the game effect has been officially determined. The sleep information confirmation unit 208 then instructs the sleep information modification unit 206 to prohibit further correction and/or registration of all or some of the sleep information or modified sleep information that was used to determine the game effect. The sleep information confirmation unit 208 continues this prohibition processing until the sleep information acquisition unit 204 next determines that the user has started to sleep.

Note that the sleep information confirmation unit 208 may halt the prohibition processing when a predetermined cancellation condition is satisfied after the game effect has been officially determined. For example, the predetermined cancellation condition may be a condition that applies a greater load to the user than the predetermined condition used by the sleep information modification unit 206 to make it possible to generate modified sleep information. For example, when consumption of a predetermined amount (a first amount) of a predetermined item is required as the condition for making it possible to generate modified sleep information, the sleep information confirmation unit 208 halts the prohibition processing when the user instructs consumption of the item in a larger amount (a second amount) than the first amount.

(Storage Unit 216)

The storage unit 216 stores various information relating to the game system 1. Each storage unit included in the storage unit 216 supplies predetermined information to a predetermined constituent component in response to requests from other constituent components of the game system 1.

(Storage Unit 216: User Information Storage Unit 218)

The user information storage unit 218 stores user information, game history information, information relating to held items, information relating to held characters, and/or sleep information and so on in association with a user ID identifying the user. Examples of the user information include a user name, which is a name set by the user, a login ID, a password, and/or information relating to the in-game virtual currency held by the user, and so on. The user information may also include information relating to an alarm time set by the user. Information relating to operation input (typically, operation input in a non-acquisition mode) executed by the user in the game may be cited as the game history information. Examples of the information relating to held items include information relating to game items held by the user. For example, the game items are items drawn by lottery by the game control unit 210 on the basis of the sleep information of the user and given to the user. The information relating to held items also includes information such as the type, number, and so on of each game item. Further, information relating to characters acquired by the user in the game may be cited as the information relating to held characters. Furthermore, sleep information relating to the sleep of the user, which is measured by the sleep measurement unit 11 (including the number of consecutive measurement days on which the sleep information was acquired), may be cited as the sleep information. The sleep information may also be associated with the date and time at which the sleep information acquisition unit 204 acquired the sleep information. For example, as the sleep information, the user information storage unit 218 can store the sleep duration of the user in association with the date and time as sleep history.

(Storage Unit 216: Game Information Storage Unit 220)

The game information storage unit 220 stores game information in association with a game information ID. Various information, such as information relating to characters appearing in the game, information relating to items, information relating to item lotteries, information relating to the in-game virtual currency, and/or predetermined voice and music information, may be cited as the game information. For example, when the game information storage unit 220 stores information relating to characters as the game information, character information serving as the game information is stored in association with a character ID serving as the game information ID. Likewise with regard to the various other types of information, various information is stored in associated with various information IDs.

[Flow of Processing of Game System 1]

Figure 4:
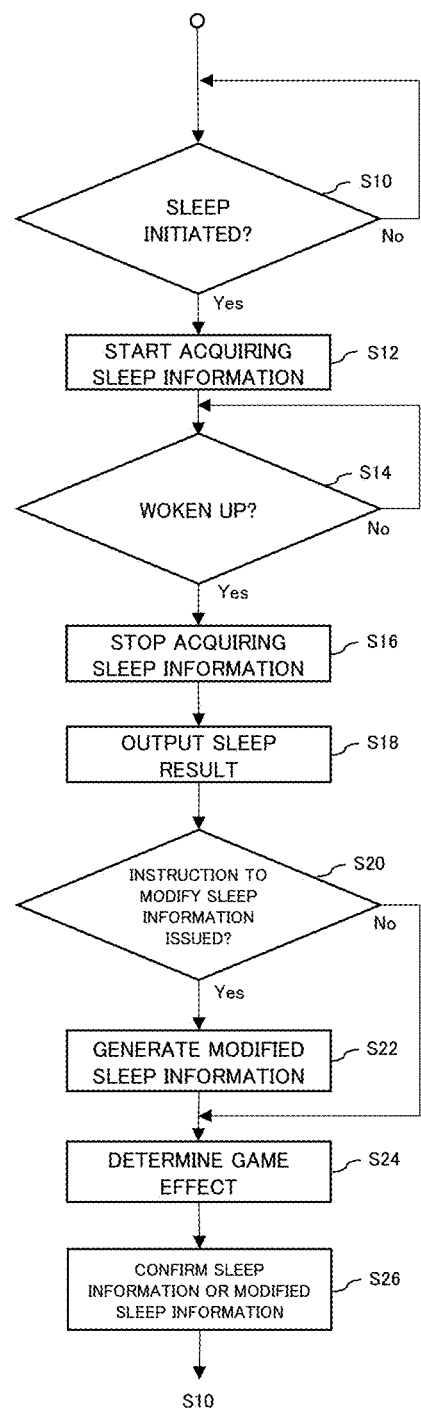
FIG. 4 is a flowchart showing processing performed in the game system according to the present embodiment.

FIG. 4 shows an example of a flow of processing performed in the game system according to the present embodiment.

First, the sleep information acquisition unit 204 determines whether or not the user has started to sleep on the basis of the measurement performed by the sleep measurement unit 11 or a sleep start instruction received from the user through the input unit 102 (step 10; hereafter, steps will be denoted by "S"). When the sleep information acquisition unit 204 determines that the user has not started to sleep (No in S10), the sleep information acquisition unit 204 waits for the user to start to sleep before acquiring the sleep information. When, on the other hand, the sleep information acquisition unit 204 determines that the user has started to sleep (Yes in S10), the sleep information acquisition unit 204 starts to acquire the sleep information of the user, measured by the sleep measurement unit 11 (S12). Note that when the sleep measurement unit 11 is not performing a measurement operation, the sleep information acquisition unit 204 causes the sleep measurement unit 11 to start measurement, and in a case where the sleep measurement unit 11 performs constant measurement, the sleep information acquisition unit 204 starts to acquire the sleep information measured by the sleep measurement unit 11 from the point at which the user starts to sleep.

The sleep information acquisition unit 204 then determines whether or not the user has woken up on the basis of the measurement performed by the sleep measurement unit 11 or a waking instruction received from the user through the input unit 102 (S14). When the sleep information acquisition unit 204 determines that the user has not woken up (No in S14), the sleep information acquisition unit 204 continues to acquire the sleep information. When, on the other hand, the sleep information acquisition unit 204 determines that the user has woken up (Yes in S14), the sleep information acquisition unit 204 stops acquiring the sleep information of the user, measured by the sleep measurement unit 11 (S16). The sleep information acquisition unit 204 supplies the acquired sleep information to the output control unit 202 and the game control unit 210.

The output control unit 202 causes the output unit 100 to output at least a part of the content of the received sleep information (S18). For example, the output control unit 202 causes the output unit 100 to output the sleep duration of the user as the sleep information. The sleep information modification unit 206 then instructs the output control unit 202 to cause the output unit 100 to output predetermined operators for requesting correction or registration of at least a part of the sleep information and indicating that correction and registration are unnecessary. When the input acquisition unit 200 receives operation input performed on the operator that corresponds to a request to correct or register at least a part of the sleep information through the input unit 102 (Yes in S20), the sleep information modification unit 206 instructs the output control unit 202 to cause the output unit 100 to output a form for receiving the correction or registration content. Then, when the input acquisition unit 200 acquires input content from the user in relation to the form through the input unit 102, the sleep information modification unit 206 generates modified sleep information on the basis of the input content (S22). Next, the game control unit 210 officially determines the game effect on the basis of the modified sleep information (S24).

When, on the other hand, the input acquisition unit 200 receives operation input in relation to the operator indicating that it is not necessary to correct or register at least a part of the sleep information through the input unit 102 (No in S20), the game control unit 210 officially determines the game effect on the basis of the sleep information acquired by the sleep information acquisition unit 204 (S24). Then, after the game effect has been officially determined on the basis of the sleep information or the modified sleep information, the sleep information confirmation unit 208 confirms the content of the sleep information or the modified sleep information used to determine the game effect until the user next starts to sleep, thereby prohibiting correction and/or registration of all or a part thereof (S26). In other words, once the game effect on the day the user wakes up has been confirmed, the sleep information confirmation unit 208 prohibits the sleep information modification unit 206 from generating modified sleep information by re-correcting the sleep information or modified sleep information that was used to confirm the effect. It is thereby possible to prevent an action for rewriting the sleep information to appropriate content a second time after acquiring a reward by confirming a game effect based on modified sleep information generated using inappropriate sleep information. The processing from S10 onward is then repeated.

Modified Example of Processing Flow of Game
System 1

Figure 5:
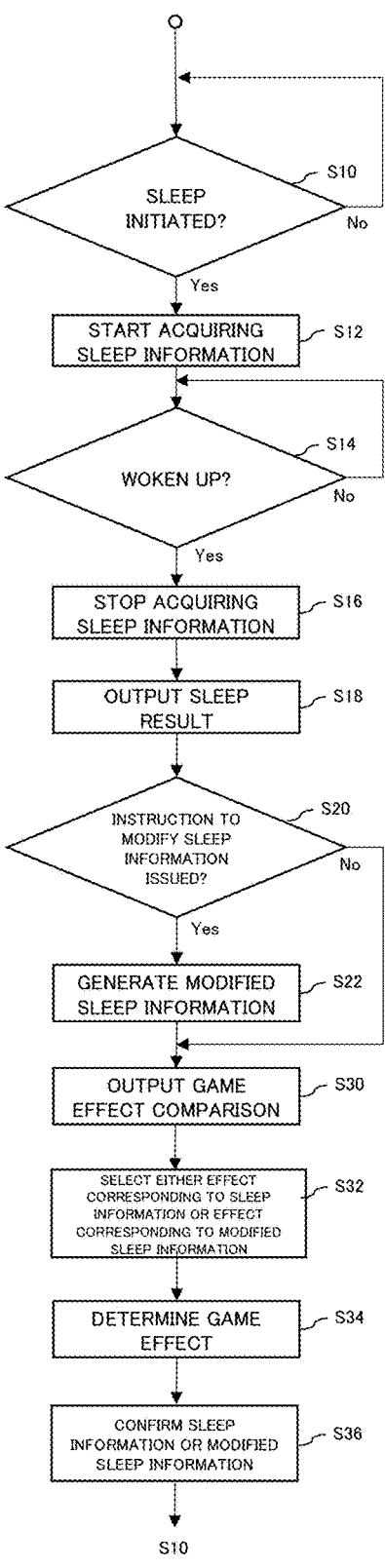
FIG. 5 is a flowchart showing a modified example of the processing performed in the game system according to the present embodiment.

FIG. 5 shows an example of a modified example of the flow of processing performed in the game system according to the present embodiment. Note that steps in FIG. 5 having identical step numbers to the steps of FIG. 4 are substantially identical to the steps of FIG. 4, and except where different, detailed description thereof has been omitted.

In S10 to S22, identical steps to those of the processing flow illustrated in FIG. 4 are performed. In the modified example of FIG. 5, after the sleep information modification unit 206 generates the modified sleep information, the game effect determined on the basis of the sleep information and the game effect determined on the basis of the modified sleep information are output in a comparable fashion (S30). More specifically, the game control unit 210 provisionally determines a game effect (the first effect) based on the sleep information acquired by the sleep information acquisition unit 204 and provisionally determines a game effect (the second effect) based on the modified sleep information generated by the sleep information modification unit 206. The game control unit 210 then instructs the output control unit 202 to cause the output unit 100 to output the first effect and the second effect in a comparable fashion. For example, the first effect and the second effect are displayed side by side on the display unit serving as the output unit 100 of the terminal device 10.

Then, when the input acquisition unit 200 acquires a selection instruction from the user to select either the first effect or the second effect through the input unit 102 (S32), the game control unit 210 officially determines the effect on the side for which the user issued the selection instruction as the game effect, and advances the game (S34). Then, after the game effect has been officially determined on the basis of the sleep information or the modified sleep information, the sleep information confirmation unit 208 confirms the content of the sleep information or the modified sleep information that was used to determine the game effect until the user next starts to sleep, thereby prohibiting correction and/or registration of all or a part thereof (S36). The processing from S10 onward is then repeated.

[Game Program]

Each of the constituent components included in the game system 1 according to the present embodiment shown in FIGS. 1 to 5 can be realized by having a calculation processing device such as a central processing unit (CPU) execute a program (in other words, a game program), or in other words by means of processing executed using software. Alternatively, the constituent components can be realized by writing the program into hardware serving as an electronic component, such as an integrated circuit (IC), in advance. Note that software and hardware can also be used in combination.

The game program according to the present embodiment can be incorporated into an IC, a ROM, or the like in advance, for example. In addition, the game program can be recorded as a file with an installable format or an executable format in a computer-readable recording medium such as a magnetic recording medium, an optical recording medium, or a semiconductor recording medium to be provided as a computer program. The recording medium storing the program may be a non-transitory recording medium such as a CD-ROM or a DVD. Furthermore, the game program can be stored in advance in a computer connected to a communication network such as the Internet, and can be provided by being downloaded through the communication network.

The game program according to the present embodiment operates the CPU or the like to cause the game program to function as the sleep measurement unit 11, the output unit 100, the input unit 102, the input screen 104, the input control unit 106, the input acquisition unit 200, the output control unit 202, the sleep information acquisition unit 204, the sleep information modification unit 206, the sleep information confirmation unit 208, the game control unit 210, the storage unit 216, the user information storage unit 218, and the game information storage unit 220, illustrated in FIGS. 1 to 5.

Advantageous Effects of Embodiment

With the game system 1 according to the present embodiment, when the sleep information of the user cannot be acquired appropriately, at least a part of the sleep information can be modified to appropriate information after the user wakes up. Hence, in the game system 1, even when the sleep information cannot be acquired due to an error in the sleep measurement unit 11 or the like or when the user forgets to activate the sleep measurement unit 11 that acquires the sleep information or the like due to carelessness, appropriate sleep information can be acquired and a game effect can be determined on the basis of the acquired sleep information. According to the game system 1, therefore, appropriate sleep information can be input or registered even when sleep information cannot be acquired appropriately, and as a result, the degree of satisfaction of the user in the game can be improved.

While an embodiment of the present disclosure has been described above, the embodiment described above is not intended to limit the disclosure as set forth in the scope of claims. In addition, it should be noted that not all combinations of features described in the embodiment are essential as solutions to the problem addressed by the disclosure. Furthermore, technical elements of the embodiment described above can be applied independently or applied by being divided into a plurality of units such as program components and hardware components.

The invention claimed is:

1. A game system for executing a game, the game system comprising:
   processing circuitry configured to
   acquire sleep information of a user from one or more sensors, wherein the sleep information includes at least sleep duration measured by the one or more sensors during a sleep period, compare the acquired sleep information against historical sleep data of the user stored in memory,
   generate modified sleep information with respect to at least a part of the sleep information by modifying the sleep information in a case that the comparison indicates the sleep information deviates from an average value of past sleep duration by a predetermined amount of time,
   in response to the sleep information not being modified, determine a first effect of the game based on the sleep information, and
   in response to the sleep information being modified, determine a second effect, the second effect differing from the first effect, based on the modified sleep information, wherein the second effect includes a reduced reward compared to the first effect.

2. The game system according to claim 1, wherein the game is executed in a terminal device,
   the processing circuitry being further configured to
   acquire an input instruction,
   output the sleep information,
   after the sleep information is output, receive an input instruction having different content related to the sleep information with respect to at least a part of the sleep information, and
   generate the modified sleep information based on the input instruction.

3. The game system according to claim 2, wherein, in response to acquiring the sleep information, the processing circuitry is further configured to
   output a first game effect based on the sleep information, wherein the first game effect corresponds to the first effect, and a second game effect based on the modified sleep information, wherein the second game effect corresponds to the second effect.

4. The game system according to claim 3, wherein the to the processing circuitry is further configured to
   output the sleep information and the modified sleep information,
   acquire a selection instruction to select either the sleep information or the modified sleep information, and
   determine the first or second game effect based on the selection instruction.

5. The game system according to claim 2, wherein, in response to receiving an input instruction from the user to modify a sleep duration as the sleep information, the processing circuitry is further configured to
   generate modified sleep information after receiving a modification not exceeding a predetermined upper limit of a modifiable sleep duration with respect to the sleep duration modification corresponding to the input instruction.

6. The game system according to claim 1, wherein the processing circuitry is further configured to generate the modified sleep information in response to a predetermined condition being satisfied.

7. The game system according to claim 1, wherein the processing circuitry is further configured to
   confirm the content of the sleep information after the first effect is determined, and
   after the sleep information has been confirmed, restrict modification of the sleep information.

8. The game system according to claim 1, wherein the processing circuitry is further configured to
   confirm the content of the modified sleep information after the second effect is determined, and after the content of the modified sleep information has been confirmed, restrict modification of the modified sleep information.

9. A method, comprising:

acquiring sleep information of a user from one or more sensors, wherein the sleep information includes at least sleep duration measured by the one or more sensors during a sleep period;

comparing the acquired sleep information against historical sleep data of the user stored in memory;

generating modified sleep information with respect to at least a part of the sleep information by modifying the sleep information in a case that the comparison indicates the sleep information deviates from an average value of past sleep duration by a predetermined amount of time;

in response to the sleep information not being modified, determining a first effect of a game based on the sleep information; and in response to the sleep information being modified, determining a second effect, the second effect differing from the first effect, based on the modified sleep information, wherein the second effect includes a reduced reward compared to the first effect.

10. A non-transitory computer-readable storage medium storing computer-readable instructions thereon which, when executed by a computer, cause the computer to perform a method, the method comprising:

acquiring a sleep information of a user from one or more sensors, wherein the sleep information includes at least sleep duration measured by the one or more sensors during a sleep period;

comparing the acquired sleep information against historical sleep data of the user stored in memory;

generating modified sleep information with respect to at least a part of the sleep information by modifying the sleep information in a case that the comparison indicates the sleep information deviates from an average value of past sleep duration by a predetermined amount of time;

in response to the sleep information not being modified, determining a first effect of a game based on the sleep information; and in response to the sleep information being modified, determining a second effect, the second effect differing from the first effect, based on the modified sleep information, wherein the second effect includes a reduced reward compared to the first effect.

11. An information processing device for executing a game, comprising:

processing circuitry configured to acquire sleep information of a user from one or more sensors, wherein the sleep information includes at least sleep duration measured by the one or more sensors during a sleep period, compare the acquired sleep information against historical sleep data of the user stored in memory, generate modified sleep information with respect to at least a part of the sleep information by modifying the sleep information in a case that the comparison indicates the sleep information deviates from an average value of past sleep duration by a predetermined amount of time, in response to the sleep information not being modified, determine a first effect of the game based on the sleep information, and in response to the sleep information being modified, determine a second effect, the second effect differing from the first effect, based on the modified sleep information, wherein the second effect includes a reduced reward compared to the first effect.

12. The game system of claim 1, wherein the processing circuitry is further configured to in response to an average value of past sleep duration of the user being different from the sleep information by a predetermined duration or more, automatically prompt the user to modify the sleep information.

13. The game system of claim 1, wherein the sleep information includes one or more of sleep duration and sleep quality.

14. The game system of claim 3, wherein the processing circuitry is further configured to provisionally determine both of the game effect for the sleep information and the game effect for the modified sleep information prior to receiving instructions corresponding to a user selection.

15. The game system of claim 1, wherein the processing circuitry is further configured to identify a foreseeable error in acquiring the sleep information, and in response to identifying the foreseeable error in acquiring the sleep information, determine the second game effect using the modified sleep information.

16. The game system of claim 1, wherein each of the first effect and the second effect corresponds to a reward in the game.

17. The game system of claim 1, wherein the processing circuitry is further configured to generate a predetermined reward in response to the sleep information being acquired consecutively for a predetermined number of days.

* * * * *